United States Patent [19]
Orr

[11] Patent Number: 5,169,596
[45] Date of Patent: Dec. 8, 1992

[54] LARGE PANEL DESIGN FOR CONTAINMENT AIR BAFFLE

[75] Inventor: Richard S. Orr, Pittsburgh, Pa.
[73] Assignee: Westinghouse Electric Corp., Pittsburgh, Pa.
[21] Appl. No.: 847,501
[22] Filed: Mar. 6, 1992
[51] Int. Cl.⁵ .......................................... G21C 13/00
[52] U.S. Cl. .................................. 376/293; 376/299
[58] Field of Search ........................ 376/293, 298, 299

[56] References Cited

U.S. PATENT DOCUMENTS 5,049,353  9/1991  Conway et al. .................. 376/293

Primary Examiner—Daniel D. Wasil
Attorney, Agent, or Firm—Z. L. Dermer

[57] ABSTRACT

The movable air baffle shield means in accordance with the present invention provides an efficient method of cooling the space surrounding the containment vessel while also providing the capability of being moved away from the containment vessel during inspection. The containment apparatus comprises a generally cylindrical sealed containment vessel for containing at least a portion of a nuclear power generation plant, a disparate shield building surrounding and housing the containment vessel therein and spaced outwardly thereof so as to form an air annulus in the space between the shield building and the containment vessel, a shield baffle means positioned in the air annulus around at least a portion of the sides of the containment vessel providing a coolant path between the baffle means and the containment vessel to permit cooling of the containment vessel by air, the shield baffle means being movable to afford access to the containment vessel.

12 Claims, 6 Drawing Sheets

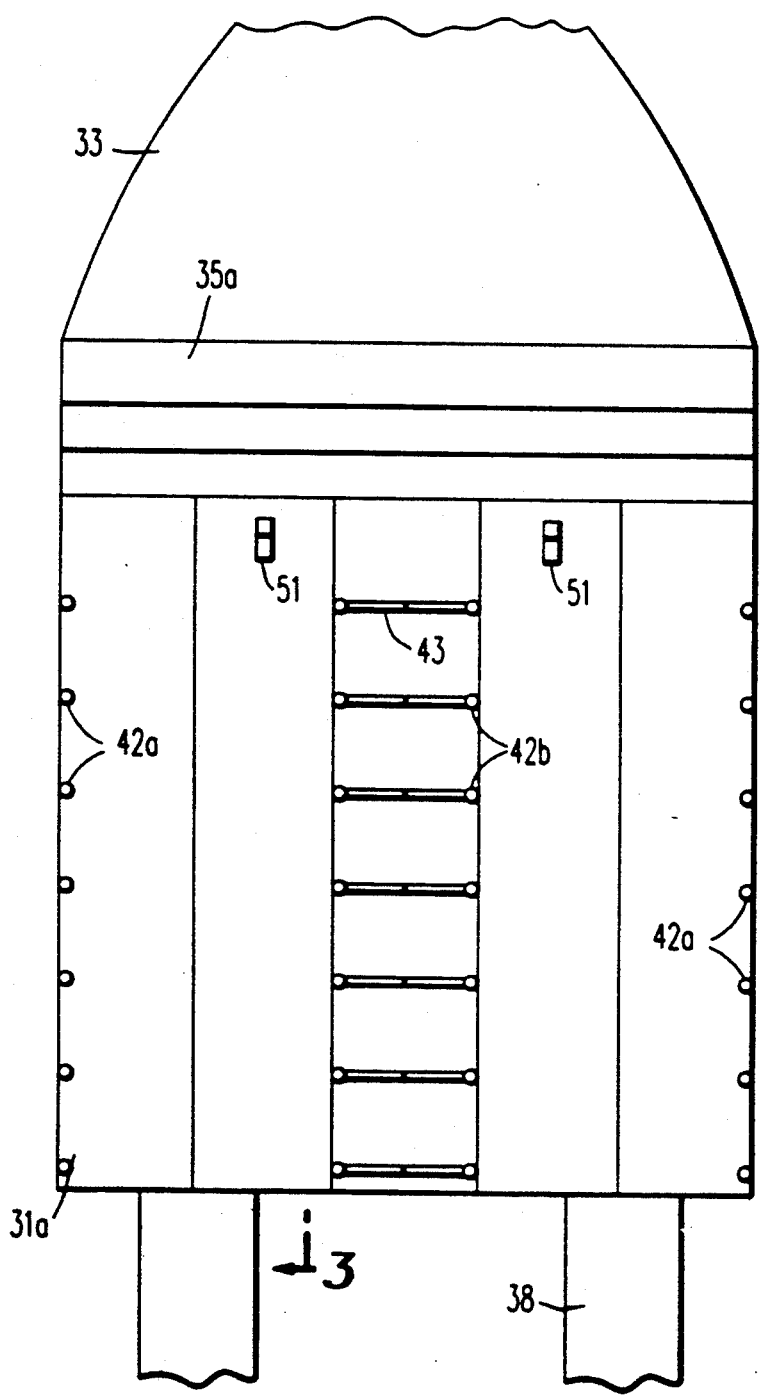
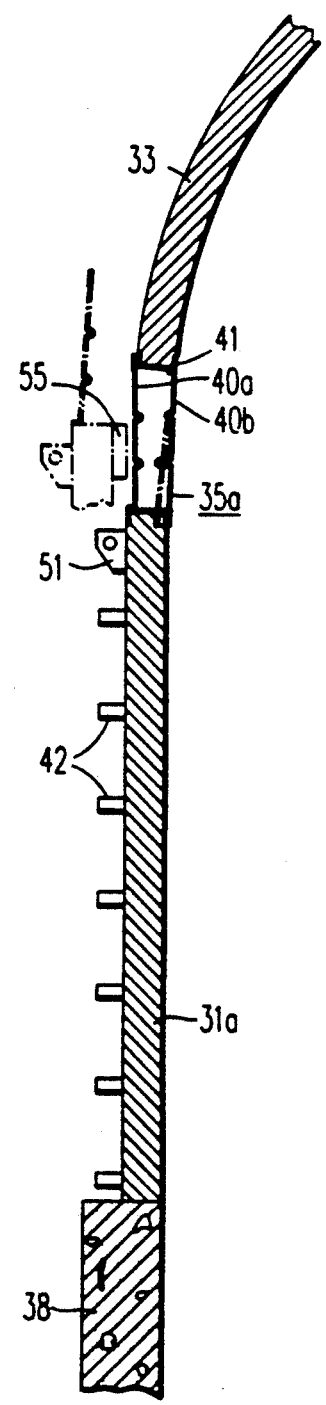
FIG. 2
FIG. 3

FIG. 6
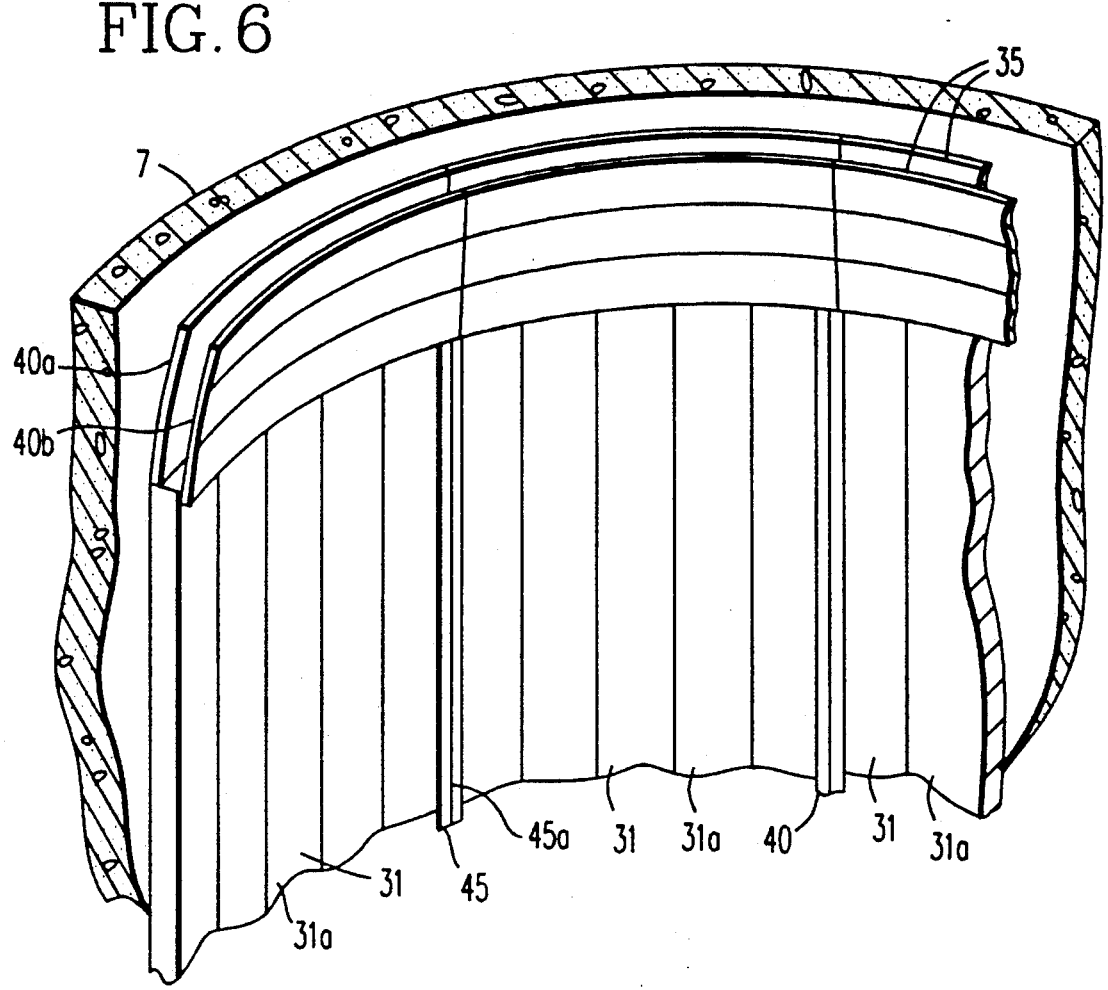
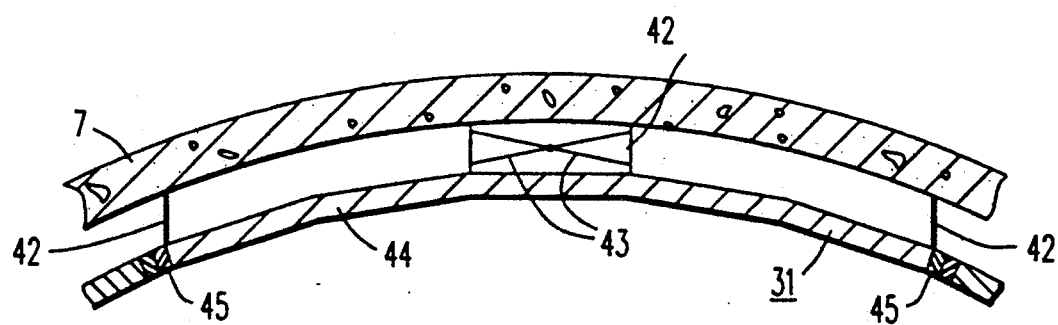
FIG. 5

LARGE PANEL DESIGN FOR CONTAINMENT AIR BAFFLE

STATEMENT OF GOVERNMENT INTEREST

The Government of the United States of America has rights in this invention pursuant to Contract No. DE-AC03-86SF18495 awarded by the Department of Energy.

BACKGROUND OF THE INVENTION

This invention relates to an apparatus for providing access to a containment vessel or the like when closely surrounded by a structure, conforming generally to the shape of the containment vessel, employed for shielding, cooling, and like purposes. More particularly, the invention is directed to a containment vessel or the like surrounded by a disparate shield building forming an air annulus with an air baffle positioned in the air annulus. A movable portion of the air baffle provides access from the exterior to the containment vessel by being movable up and away from the containment vessel toward the shield building.

A nuclear power generating station is divided into two basic systems, a containment vessel containing the nuclear core for heating a coolant, such as water, and a steam utilization system containing a steam utilization and conversion means, such as a steam turbine-generator system. In a power plant of the pressurized water reactor type (PWR) two separate coolant flow systems are provided in heat exchange relationship with each other, while in a power plant of the boiling water reactor type (BWR), a single or primary coolant flow system having a light water coolant is employed, which coolant is heated by the reactor core so that it is converted to steam and the steam directly operates the steam turbine of the steam utilization and conversion means. In both the PWR and BWR types, the reactor vessel and certain auxiliary equipment are contained in a separate structure, called a containment, because nuclear reactions producing radiation are occurring and must be contained in a structure with extremely rigid standards to contain the radiation in the unlikely event of an accident. The separate containment typically has one of two designs. One design comprises a unitary containment vessel typically made of concrete with a steel liner. The second design comprises a two tier structure comprising a steel structure, referred to herein as the containment vessel, disposed within a separate concrete building called a shield building. Within the containment vessel, the reactor core is disposed inside the reactor vessel and includes uranium pellets used in the nuclear reaction which generates heat. A coolant such as light water is circulated through the nuclear core reaction area. In the PWR type system, the coolant circulates in a loop entirely within the containment and transfers the heat from the nuclear core to the secondary system steam turbine located outside of the containment. In the BWR type, the heated coolant exits the containment as steam in a single system and flows directly to a steam turbine located outside of the containment.

In systems employing the two tier design including a containment vessel disposed within a shield building, an apparatus is needed to remove the ambient heat surrounding the containment vessel during the unlikely event of an accident. To accomplish such heat removal, a system such as a passive containment cooling system may be used. Passive containment cooling uses natural air circulation to remove the heat by flowing air into a shield building and over the surface of the containment vessel and then out of the shield building. To minimize the cooling space surrounding the containment vessel, an air baffle is positioned close to the containment vessel. During non-operational periods the containment vessel may require maintenance, inspection and the like. Because the air baffle is positioned close to the containment vessel, inspection is restricted due to the limited space between the air baffle and the containment vessel.

U.S. Pat. No. 5,049,353 issued on Sep. 17, 1991 teaches a passive cooling system in which the air baffle in conjunction with cooling water form a system of providing a passive cooling system. This patent teaches a disparate shield building surrounding and containing a containment vessel forming an air annulus in the space between the shield building and the containment vessel. To create a circulation path, an air baffle is positioned in the air annulus forming an inner and outer annulus. Natural air flows into the shield building through openings located in the shield building wall at the intersection of the roof and wall and down the outer annulus and around the bottom of the air baffle. Next, the air flows up the inner annulus adjacent the containment vessel and exits through an opening in the shield building roof. The cooling water located in the roof portion of the shield building, may be used inside the shield building for additional cooling. This cooling water is sprayed under the forces of gravity onto the containment vessel. However, U.S. Pat. No. 5,049,353 does not disclose an apparatus which will allow maintenance workers and the like to inspect, repair, and the like in the area surrounding the containment vessel.

The present invention teaches a passive containment cooling system, such as in U.S. Pat. No. 5,049,353, and adds advantages such as an air baffle being movable located surrounding a major portion of the containment vessel. When inspection or the like is needed, the movable air baffle moves up and away toward the shield building allowing access to the containment vessel.

The present invention has several advantages over the prior art. First, it provides accessibility to the containment building for maintenance and the like during non-operation. This access is advantageous because of the nominal outage time available for performing preventive maintenance procedures when repairs are needed.

Another advantage is the efficient means in which access is provided. Partial access to sections of the containment vessel is provided by partitioning of the air baffle. This further enhances preventive maintenance, nominal outage during repairs, and the like.

SUMMARY OF THE INVENTION

It is therefore an object of the present invention to provide a means of cooling the space surrounding the containment vessel while also providing the capability of increasing the immediate space surrounding the containment vessel during inspection and maintenance operations.

Another object of the present invention is to provide an air baffle that is partitioned into segments enabling efficient inspection of the containment vessel by sections.

These objects and others to become apparent are accomplished by a containment apparatus for containment of a system such as for a nuclear reactor system comprising a generally cylindrical sealed containment vessel for containing at least a portion of a nuclear power generation plant, a disparate shield building surrounding and housing the containment vessel therein and spaced outwardly thereof so as to form an air annulus in the space between the shield building and the containment vessel, a shield baffle means positioned in the air annulus around at least a portion of the sides of the containment vessel providing a coolant path between the baffle means and the containment vessel to permit cooling of the containment vessel, the shield baffle means being movable to afford access to the containment vessel.

BRIEF DESCRIPTION OF THE DRAWINGS

While the specification concludes with claims particularly pointing out and distinctly claiming the subject matter of the invention, it is believed the invention will be better understood from the following description, taken in conjunction with accompanying drawings wherein:

FIG. 2 is an elevational view of outer periphery of the air baffle;

FIG. 3 is a view in section of a portion of the air baffle, wherein the combined fixed and movable baffles are detailed;

FIG. 5 is a sectional view of a portion of the shield building depicting the attachment of the movable baffle to the shield building wall and taken generally along the lines V—V of FIG. 4;

FIG. 6 is a view partially in section and partially in elevation of a portion of the shield building and of the movable baffle means and further illustrating a portion of the fixed baffle means;

DESCRIPTION OF THE PREFERRED EMBODIMENTS

Figure 1:
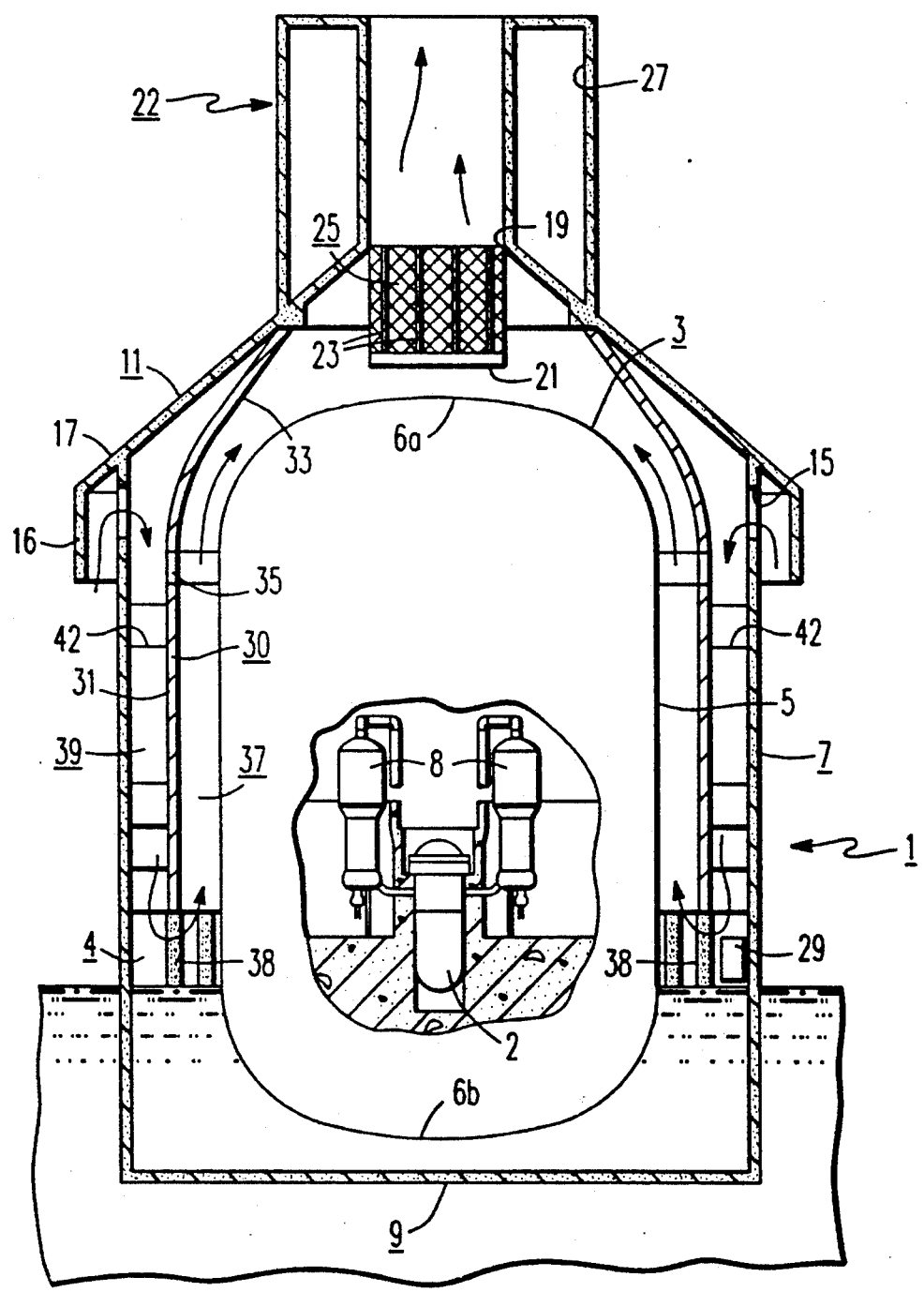
FIG. 1 is a general cross sectional view of the shield building surrounding and containing a containment vessel and air baffle, the latter having sections broken away, and according to the present invention.

Referring now to the drawings wherein like reference numerals refer to like elements, FIG. 1 depicts a shield building 1 which encloses a containment vessel 3, yet spaced outwardly thereof with the space formed between the two referred to herein as the annulus 4. The containment vessel 3 is desirably made of steel and has a generally cylindrical side 5 and a generally hemispherical or ellipsoidal top 6a and bottom 6b. Illustrated by way of example inside the containment vessel 3 is a portion of the primary system of a pressurized water reactor including a reactor vessel 2 and two steam generators 8, both well known in the art. The shield building includes a generally cylindrical side wall 7 which terminates at its lower end with a floor 9, and at its upper end by a frustoconical roof 11. The wall 7, made of, for example, reinforced concrete, includes a plurality of openings 15 spaced circumferentially about the upper end of the wall 7 for allowing air to enter the shield building 1. Each opening 15 in this embodiment has a wire mesh screen positioned in it to prevent debris and the like from entering through the opening 15. The frustoconical roof 11 is desirably made of a structural material, such as reinforced concrete and includes an angled roof portion 17 which closes the upper end of the wall 7 and includes a skirt 16 extending from its lower edge and extending concentrically with a portion of wall 7 thereby providing additional protection from external conditions. The frustoconical roof 11 includes a circular opening 19 in the center of the roof 11 with a cupola-like structure 22 extending upwardly over the roof 11 and surrounding the opening 19. A circular platform 21 is located directly above the center of the containment vessel 3 and below the opening 19 in the roof 11. The platform 21 is supported from the roof 11 by beams 23 attached to the periphery of the circular opening 19. A wire mesh screen 25 is positioned surrounding the beams 23 forming a cylinder like apparatus between the platform 21 and the opening 19. This prevents larger objects such as birds and the like from entering the shield building 1. The cupola structure 22 includes a water storage tank 27 of a toroidal-like configuration. The water storage tank 27 provides a source of water for the inside the shield building 1 for cooling when ambient air passing over the containment vessel may be insufficient, for example, in the unlikely event of an accident in which large quantities of heat are generated inside vessel 3. One means of access inside the shield building 1 is through a door 29 located in the lower end of the wall 7. Another means of access is through one of the openings 15. An elevator (not shown) positioned outside of the shield building 1 is used to access the opening 15 at the top of the shield building wall 7. The opening 15 adjacent the elevator has hinges or the like (not shown) allowing it to be opened or removed.

A partially fixed, partially movable air baffle means 30 is disposed within the shield building 1 and comprises three major components, i.e., a sectional movable baffle means 31, a fixed baffle means 33 and a combined fixed and movable baffle means 35. Referring to FIGS. 1 and 2, the fixed baffle 33 is shown as a unitary structure while the movable baffle 31, and combined fixed and movable baffle 35 are divided into defined sections respectively herein referred to as movable sections 31a, and combined fixed and movable sections 35a. The fixed baffle 33 is supported and attached from the shield building roof 11. Each movable sections 31a is supported by at least two vertical columns 38, made of for example concrete, positioned beneath each movable section 31a and each vertical column 38 extends to the floor 9. A plurality of support means 42 are for additional support of the movable sections 31a and are attached and positioned at one end to each movable section 31a. Each support means 42 on the other end is attached to the shield building wall 7. The air baffle 30 is positioned in the annulus 4 dividing the annulus 4 into an inner annulus 37 and outer annulus 39 surrounding the inner annulus 37. The air baffle 30 generally has a shape that conforms to the shape of the containment vessel 3. The movable baffle means 31 is the lower part of the air baffle means 30, the fixed baffle means 33 is the upper part thereof, with the combined fixed and movable baffle means 35 positioned between the fixed baffle means 33 and the movable baffle means 31. The movable baffle means 31 is positioned surrounding a major portion of the cylindrical side 5 portion of the containment vessel 3. The fixed baffle means 33 is positioned surrounding the top hemispherical or ellipsoidal portion 6a of the containment vessel 3. The fixed baffle means 33 has a frustoconical shape with both ends open allowing air passage.

Referring to FIGS. 1 and 3, the combined fixed and movable baffle means 35 is divided into sections and each section 35a is comprised of two metal plates 40a and b. Each outer plate 40a is attached to the outer surface of the adjacent movable sections 31a. The inner plate 40b is attached to the fixed baffle 33 adjacent the inner wall thereof and extends into engagement with the adjacent movable section 31a. Each outer plate 40a, at its upper portion, is contiguous to and overlapping with the fixed baffle 33 and the lower end of each plate 40a is secured by suitable means, such as by bolts (not shown), to the adjacent movable section 31a. Each inner plate 40b is attached, at its top, to the lower end of the fixed baffle 33 by a suitable securing means such as by bolts (not shown), an elastomer material 41 may be positioned between the bolts and the inner plate 40b. The elastomer material 41 may comprise a long, thin, belt like configuration extending the entire width of the lower surface of fixed baffle 33. The elastomer material 41 functions as a supplemental biasing means spring means with each inner plate 40b to result in a slight horizontal outward movement of the inner plate 40b which may be designed to be biased outwardly a small but fixed amount when the bottom portion thereof is disengaged from adjacent baffle segment 31a. Inner plate 40b, at its lower end, is contiguous to and overlapping with each adjacent baffle section 31a. A plurality of long, thin, belt-like elastomer pads 55 are also attached at the top and extend the entire width of each respective movable section 31a and is positioned to be between each inner plate 40b and movable section 31a when the movable sections 31a are in the normal position. Elastomer pad 55 functions to cushion and form a general seal between the movable section 31a and inner plate 40b. When the movable section 31a is moved up and away from the containment vessel 3 (as illustrated in phantom in FIGS. 3 and 4) the inner plate 40b is biased to move slightly in an outwardly direction. The outer plate 40a moves generally with the movable sections 31a as it is moved up and away from the containment vessel 3. When the movable section 31a are returned to the normal position the elastomer pad 55 on each movable section 31a pushes slightly against the bottom portion of each inner plate 40b and forces it into the normal position thus effecting a seal between elastomer 55 and plate 40b. Concurrently, the outer plate 40a moves with the movable sections 31a when each movable section 31a is returned to the normal position, as shown in FIG. 3, so that the upper edges of sections 31a engage fixed baffle 33.

Referring to FIG. 1, the shield building 1 and air baffle 30 cooperate to form a passive containment cooling system which functions to provide a pathway for natural circulation to occur thereby removing ambient heat dissipated by the containment vessel 3. The passive containment cooling system is designed to function in the unlikely event of an accident where a large energy release occurs or when normal cooling fans are not available or the like. Heat removal is accomplished by allowing air to flow into the opening 15 of the shield building 1 and down the outer annulus 39. The air then flows around the bottom of the movable shield baffle means 31 and upward in the inner annulus 37 thereby cooling the containment vessel 3. The air is directed along the inner boundary of the fixed baffle means 33 then through the opening 19 containing the wire mesh 25 at the top of the shield building 1.

Referring to FIG. 5, in this embodiment of the invention, the defined sections 31a of the movable baffle 31 are comprised of flat planar surfaces 44 at angle increments of approximately six degrees. As shown in FIG. 6, the movable baffle means 31 is divided into several defined sections 31a. A sealing means 45 is positioned between adjacent movable baffle sections 31a to prevent significant air leakage across the air baffle boundary providing an essentially continuous inner surface. The sealing means 45 in this embodiment may comprise, for example, a dichotomous seal creating a seam 45a at the center of the seal 45. One segment of seal 45 is rigidly attached to each respective movable baffle section 31a. The splitting of the sealing means 45 enables the seal to follow the movable shield baffle sections 31a to which the seal is attached when the movable baffle 31 is moved up and away. The two portions of the seal 45 are compressed together as the movable baffle 31a is moved into its operating position.

Figure 4:
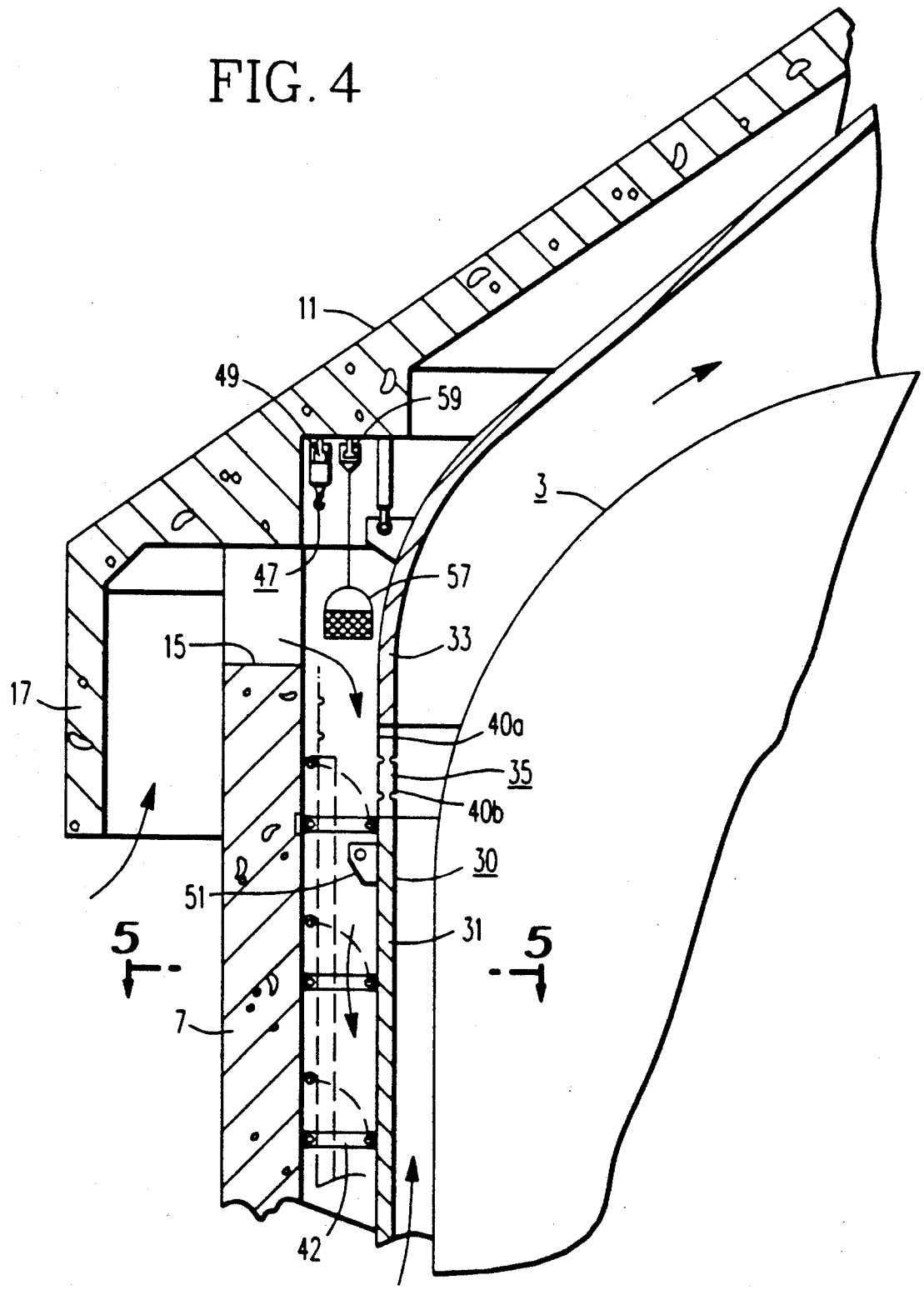
FIG. 4 is a cross section of a segment of the shield building depicting the intersection of the wall and the frustoconical roof; the movable baffle means is shown in the normal operating position and in phantom, in the position up and away from the containment vessel to provide access thereto.
Figure 7:
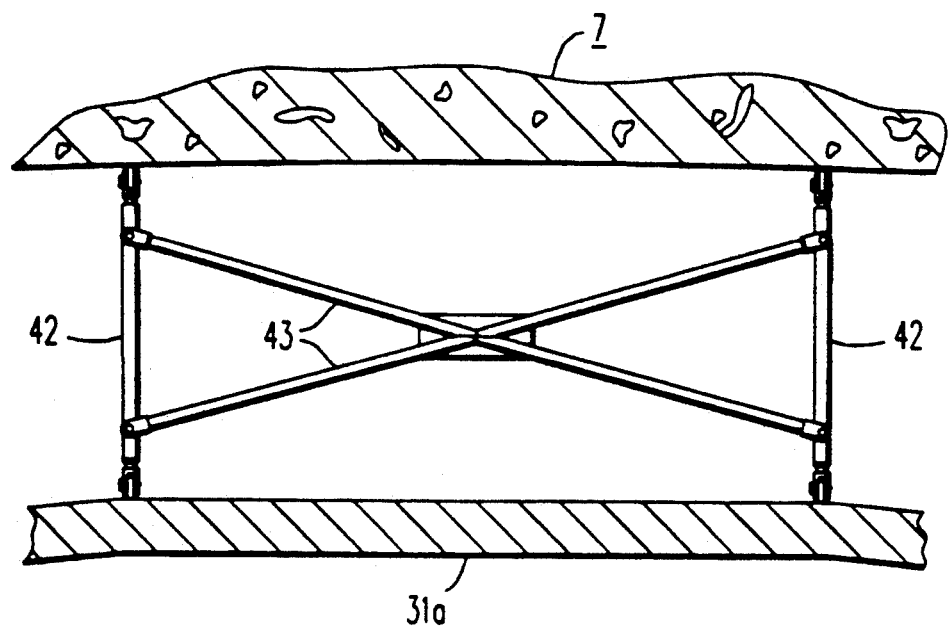
FIG. 7 is an enlarged sectional view depicting a portion of the shield building and a movable baffle section and showing the movable support means for the movable baffle section.

As shown in FIGS. 4 and 7, a plurality of support means 42 are rigidly and pivotally attached to the wall 7 of the shield building 1 and to the movable baffle section 31a respectively. FIG. 3 illustrates an example of an appropriate vertically aligned configurations for support means 42 and includes outer support means 42a, inner support means 42b, and cross brace 43. Each of the plurality of movable baffle sections 31a is supported in an adequate manner, for example by outer support means 42a at the outer edges and inner support means 42b in conjunction with cross brace 43 at the midsection of the movable baffle section 31a. This configuration of outer support means 42a, inner support means 42b, and cross brace 43 is repeated in this example at seven vertical locations along each plurality of baffle sections 31a. Referring to FIG. 5, each inner support means 42b at the midsection of each movable baffle section 31a is further supported by a cross brace 43. Regulations require that equipment or systems essential to the operation of nuclear facilities be capable of withstanding seismic events. The cross braces 43 are an example of support means which will provide the required additional support that may be required during seismic events. The support means 42 are all parallel to each other on each movable baffle section 31a and include a pivotal clevis mount 41 at each end which allows movement in a vertical plane.

Figure 9:
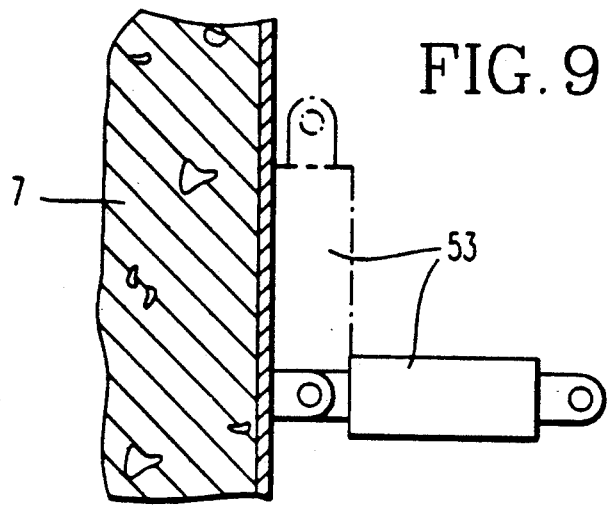
FIG. 9 is a plan view of the hinged support means illustrating the movement of the hinged support means.
Figure 8:
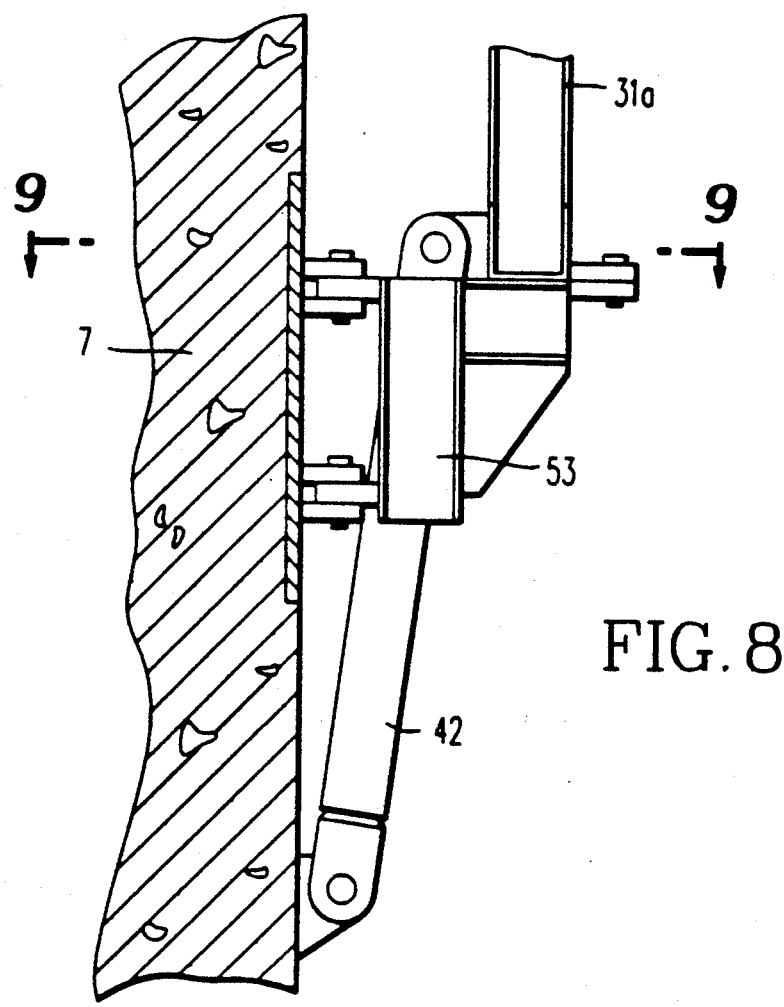
FIG. 8 is a side view of hinged support means and bottom support means after it is rotated perpendicular to the shield building wall.

Referring to FIG. 4, a lifting means 47 positioned inside the shield building 1 at the intersection of the roof 11 and the wall 7 comprises a cable with a hook on the end and a means for lowering and raising the cable. The lifting means 47 may be moved circumferentially around the shield building by a monorail 49 to allow each movable baffle sections 31a to be lifted. At least two eyebolt devices 51 are attached to the movable baffle section 31a. The cable is lowered with a lifting bridle (not shown) attached to the hook. A lifting bridle comprises at least two or more cables connected or bonded together at one of the cable ends and a device for latching, such as metal rings, attached at the bonded point of the cables and at the unconnected ends of each cable. The lifting bridle attaches to one or more eyebolts 51 and the cable is lifted thereby lifting the movable baffle section 31a. A personnel basket 57 may be used in this embodiment and is positioned at the intersection of the wall 7 and roof 11 with the capability to support maintenance workers inside the personnel basket 57. The personnel basket 57 includes a basket-like structure attached by cable to a monorail 59 allowing it to move circumferentially around the containment vessel 3. Maintenance personnel inside the basket can attach the lifting bridle to the eyebolts 51 and perform disengagement, adjustment, and like activities. Referring to FIG. 8, each section 31a of the movable baffle 31 is retained in the up and away position by at least two hinged support devices 53 located on the wall 7. These supports are positioned and hinged so that they fold out of the way as the movable section 31a is raised and may be rotated into position to support the movable section 31a after it is raised. Hinged support devices 53 swing generally horizontally outwardly to support the adjacent baffle segment 31a in a manner similar to a door and are positioned up against the wall 7 when movable sections 31a are being lifted up and away from the containment vessel 3. Each support device 53 is rotated perpendicular to the shield building wall 7 after the movable section 31a is lifted slightly above support devices 53. Movable sections 31a are then slightly lowered onto support devices 53. Support devices 53 may be accessed from the floor 9, as shown in FIG. 1, to rotate the hinged platform devices 53. As best seen in FIG. 9, when the support device 53 is not in use support device 53 is positioned against wall 7 (as illustrated in phantom). To support the movable baffle 31 in the position up and away from the containment vessel 3 (FIG. 1), support device 53 is rotated perpendicular to wall 7. An alternative method of retaining each movable baffle sections 31a up and away from the containment vessel 3 is for the hoisting means 47 (FIG. 4) to maintain the movable baffle means 31 in the up and away position from the containment vessel 3.

The method by which the movable baffle sections 31a are moved up and away from the containment vessel 3 allowing access to the outer surface of the containment vessel as desired, is as follows. Referring to FIG. 4, first the personnel basket 57 is lowered to a position adjacent a movable section 31a. A lifting bridle (not shown) is attached to the hoisting means 47 cable. The lifting bridle is lowered to a position near the personnel basket 57 to allow a person inside the personnel basket 57 to grasp the lifting bridle. The lifting bridle is attached to eyebolts 51 on one movable section 31a. The personnel basket 57 is raised to a position so as not to interfere with the lifting of the movable sections 31a. Next, the hoisting means 47 lifts the movable section 31a with the removable section inner plate 40b remaining stationary and the outer plate 40a moving with the movable section 31a. The movable section 31a is maintained in the up and away position by the hoisting means 49. An alternate means of maintaining the baffle sections 31a in the up and away position is by hinged support devices 53 located on the wall 7 of the shield building 1. The hinged support devices 53 are hinged out of the way so that platform devices 53 fold out of the way as the movable section 31a is raised and may be rotated into position to support the movable section 31a after it is raised. The lifting of each movable section 31a is repeated until all sections 31a have been moved and the entire outer surface of containment 3 is accessible. The procedure is reversed to return the movable sections 31a to the normal position.

What is claimed is:

1. A containment apparatus for containment of
   a nuclear reactor system, comprising: a generally cylindrical sealed containment vessel for containing at least a portion of a nuclear power generation plant;
   a disparate shield building surrounding and housing the said containment vessel therein and spaced outwardly thereof so as to form an air annulus in the space between the said shield building and said containment vessel;
   a movable baffle means positioned in the air annulus around at least a portion of the side of said containment vessel providing a coolant path between said baffle means and said containment vessel to permit cooling of said containment vessel; said baffle means being movable in said space away from said containment vessel to afford access to the containment vessel.

2. The apparatus as recited in claim 1 wherein said movable baffle means is partitioned into a plurality of defined sections; support means for supporting said movable baffle means respectively and extending from said shield building to each of said sections for attaching each of said sections to said shield building; each of said support means having one end rigidly yet pivotally attached to said shield building and the other end rigidly yet pivotally attached to one of said sections, and said sections each being movable toward the building and up and away from said containment vessel to provide access to the vessel for maintenance purposes.

3. The apparatus as recited in claim 2 further comprising a sealing means positioned between each of said sections to form a seal between adjacent sections and forming an essentially continuous inner surface preventing significant leakage across said shield baffle means.

4. The apparatus as recited in claim 2 wherein said sections are located to surround a major portion of the cylindrical side portion of said containment vessel.

5. The apparatus as recited in claim 2 wherein said support means includes pivoted joints allowing movement up and away from said containment vessel; a bracing means located between at least some of said support means providing bracing against seismic movements.

6. The apparatus as recited in claim 2 wherein each of said sections of said movable baffle means can be moved toward said shield building, upward and away from said containment vessel and an outer plate moves with said movable sections and an inner plate remains generally stationary when said movable sections are moved up and away.

7. The apparatus as recited in claim 2 wherein said sections are lifted by a hoisting means positioned near the intersection of the roof and wall of said shield building; said hoisting means is lowered and attached to said movable baffle means and said movable baffle means is moved up and away from said containment vessel; said hoisting means may be moved circumferentially around said containment vessel by a monorail to allow lifting of each of said plurality of movable baffle means.

8. The apparatus as recited in claim 7 wherein each of said movable sections may be maintained in the position up and away from said containment vessel by said hoisting means.

9. The apparatus as recited in claim 2 wherein each of said movable sections may be maintained in the position up and away from said containment vessel by hinged support devices positioned on said shield building wall; said hinged support devices are folded against said wall as said movable sections are raised and rotated to support said movable sections after said sections are in the position up and away from said containment vessel.

10. The apparatus as recited in claim 7 further comprising a personnel basket positioned near the intersection of a wall and roof of said shield building and capable of supporting maintenance workers and being lowered in said air annulus enabling maintenance workers inside to attach said hoisting means to said movable sections.

11. The apparatus as in claim 2 further comprising a fixed baffle supported from a roof of said shield building and located above yet spaced apart from said movable sections.

12. The apparatus as recited in claim 11 further comprising a combined fixed and movable baffle means positioned immediately above said movable baffle means; said combined fixed and movable baffle means includes an inner and outer plate; a lower portion of outer plate is rigidly attached to said adjacent movable sections and an upper portion of outer plate is contiguous and overlapping with said adjacent fixed baffle; an upper portion of inner plate is rigidly attached to said adjacent fixed baffle including an elastomer material between said rigid attachment and said upper portion, and a lower portion of inner plate is contiguous and overlapping said adjacent movable sections; said combined and fixed baffle means includes an elastomer material attached to upper portion of each said movable sections providing a seal between said inner plate and said movable sections.

* * * * *